United States Patent
Case Myers et al.

(10) Patent No.: US 11,964,718 B2
(45) Date of Patent: Apr. 23, 2024

(54) TORSION LIMITING TIE ROD FOR VEHICLE STEERING SYSTEM

(71) Applicant: Steering Solutions IP Holding Corporation, Saginaw, MI (US)

(72) Inventors: Christopher R. Case Myers, Freeland, MI (US); Eric D. Pattok, Frankenmuth, MI (US); Travis L. Palmer, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/087,962

(22) Filed: Dec. 23, 2022

(65) Prior Publication Data
US 2023/0286579 A1 Sep. 14, 2023

Related U.S. Application Data

(60) Provisional application No. 63/318,222, filed on Mar. 9, 2022.

(51) Int. Cl.
*B62D 7/20* (2006.01)
*B62D 7/16* (2006.01)

(52) U.S. Cl.
CPC ............... *B62D 7/20* (2013.01); *B62D 7/16* (2013.01)

(58) Field of Classification Search
CPC ............ B62D 7/20; B62D 7/16; B62D 7/163
See application file for complete search history.

(56) References Cited

U.S. PATENT DOCUMENTS

| | | | | |
|---|---|---|---|---|
| 3,447,232 A | * | 6/1969 | Stillwagon, Jr. | F16D 3/40 29/434 |
| 4,004,434 A | * | 1/1977 | Raby | F16D 3/40 464/134 |
| 4,761,019 A | * | 8/1988 | Dubensky | B60G 7/001 403/114 |
| 5,074,698 A | * | 12/1991 | Lippert | B62D 7/16 403/79 |
| 5,083,626 A | * | 1/1992 | Abe | F16C 35/061 180/445 |
| 5,135,067 A | * | 8/1992 | Kohata | B62D 5/0427 318/653 |
| 5,685,390 A | * | 11/1997 | Chikuma | B62D 5/0448 74/424.89 |
| 5,767,642 A | * | 6/1998 | Furukawa | B62D 5/0466 180/404 |
| 5,871,065 A | * | 2/1999 | Onodera | B62D 5/0403 180/443 |
| 9,988,083 B1 | * | 6/2018 | Smith | B60G 3/20 |
| 2008/0108446 A1 | * | 5/2008 | Faude | F16D 3/40 464/136 |
| 2013/0119627 A1 | * | 5/2013 | Tashiro | B62D 7/228 280/93.51 |

* cited by examiner

*Primary Examiner* — Frank B Vanaman
(74) *Attorney, Agent, or Firm* — Dickinson Wright PLLC

(57) ABSTRACT

A joint assembly for a steering tie rod assembly includes a tie rod. The joint assembly also includes a yoke including a first leg and a second leg, wherein each of the first and second legs define a respective hole aligned with each other. The joint assembly further includes a first pin extending through each of the respective holes defined by the first leg and the second leg of the yoke and through a first hole of the tie rod. The joint assembly yet further includes a second pin disposed in a second hole defined by the tie rod and defining a central hole that the first pin extends through.

8 Claims, 4 Drawing Sheets

TORSION LIMITING TIE ROD FOR VEHICLE STEERING SYSTEM

CROSS-REFERENCE TO RELATED APPLICATION

This application claims the benefits of priority to U.S. Provisional Patent Application Ser. No. 63/318,222, filed Mar. 9, 2022, the disclosure of which is incorporated by reference herein in its entirety.

FIELD OF THE INVENTION

The present disclosure relates to vehicle steering systems and, more specifically, to torsion limiting tie rod for such steering systems.

BACKGROUND

Various electric power steering (EPS) systems have been developed for assisting an operator with vehicle steering. One type of EPS system is referred to as a rack electric power steering (REPS) system. A REPS system utilizes an electric motor that drives a ball nut and rack. The rack teeth are engaged with a pinion. The pinion complements a power steering assist feature that is rotated in response to rotation of a portion of the steering column by an operator, with the power steering assist feature providing a steering input to the rack. The power steering assist feature may be integrated with the steering column (i.e., single pinion electric power steering system) or may be a driving pinion (i.e., dual pinion electric power steering system), for example. Additionally, some REPS systems provide steering assist with a belt and ball nut mechanism.

Current steering systems use a ball-in-socket style tie rod that allows rotation to prevent torsional load transfer into the rack. With this style joint, a secondary mechanism is need to prevent steering rack rotation in the steering system. This may be accomplished with an anti-rotation bushing or with the pinion shaft, for example.

SUMMARY OF THE DISCLOSURE

According to one aspect of the disclosure, an electric power steering system includes a ball screw. The electric power steering system also includes a tie rod having an end region, wherein the tie rod defines a first hole extending along a first axis at the end region, wherein the tie rod defines a second hole extending along a second axis that intersects with, and is substantially perpendicular to, the first axis at the end region. The electric power steering system further includes a joint assembly operatively coupling the end region of the tie rod to the ball screw. The joint assembly includes a yoke including a first leg and a second leg, wherein each of the first and second legs define a respective hole aligned with each other. The joint assembly also includes a first pin extending through each of the respective hole defined by the first leg and the second leg of the yoke and through the first hole of the tie rod. The joint assembly further includes a second pin disposed in the second hole defined by the tie rod and defining a central hole that the first pin extends through.

According to another aspect of the disclosure, a joint assembly for a steering tie rod assembly includes a tie rod. The joint assembly also includes a yoke including a first leg and a second leg, wherein each of the first and second legs define a respective hole aligned with each other. The joint assembly further includes a first pin extending through each of the respective holes defined by the first leg and the second leg of the yoke and through a first hole of the tie rod. The joint assembly yet further includes a second pin disposed in a second hole defined by the tie rod and defining a central hole that the first pin extends through.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the embodiments described herein are used in conjunction with a steering assembly of a vehicle, such as a car, truck, sport utility vehicle, crossover, mini-van, marine craft, aircraft, all-terrain vehicle, recreational vehicle, or other suitable vehicles, including various steering system schemes.

Figure 1:
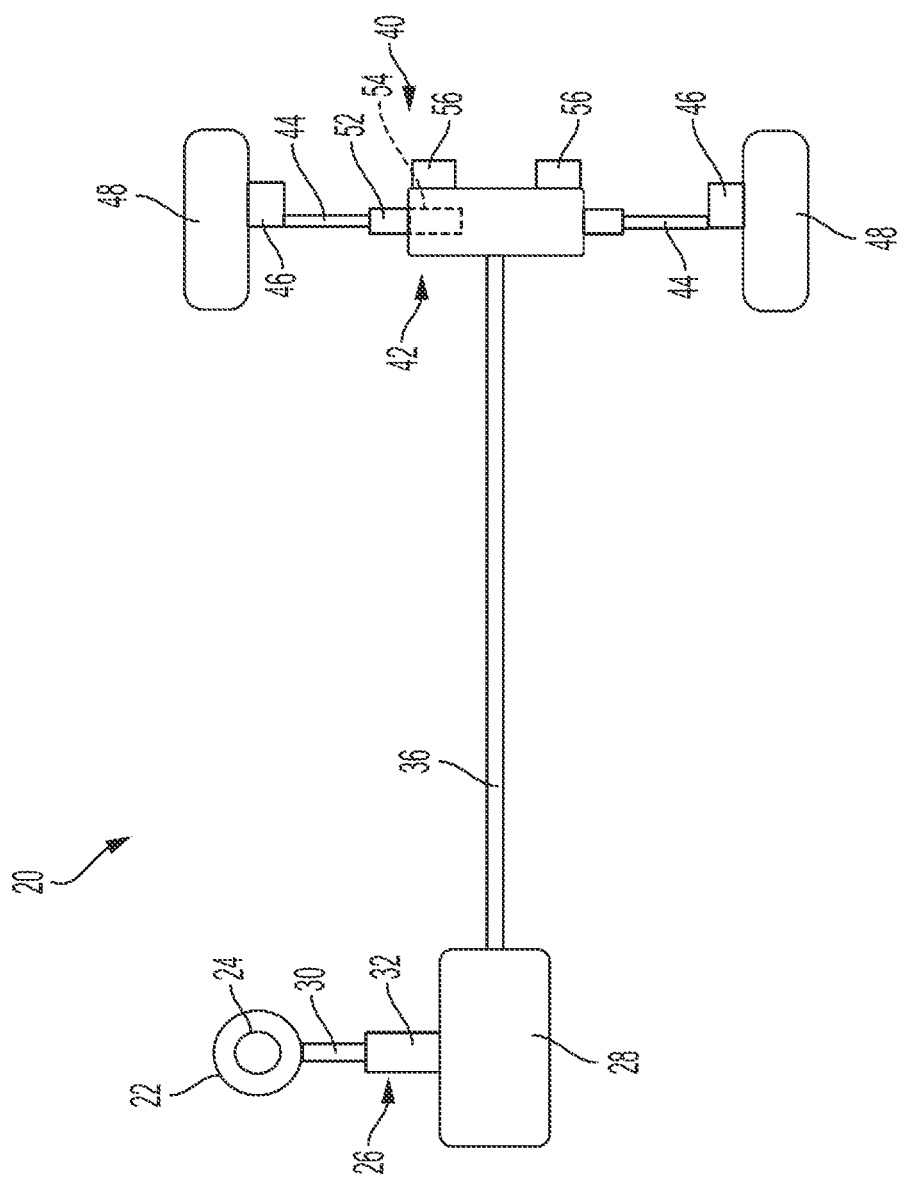
FIG. 1 schematically illustrates an electric power steering (EPS) system for a vehicle.

Referring to FIG. 1, generally illustrated is an electric power steering system 20. The power steering system 20 may be configured as a driver interface steering system, an autonomous driving system, or a system that allows for both driver interface and autonomous steering. The steering system 20 may include an input device 22, such as a steering wheel, wherein a driver may mechanically provide a steering input by turning the steering wheel, an airbag device 24 located on or near the input device 22, and a steering column 26 extending along an axis from the input device 22 to an output assembly 28. The steering column 26 may include at least two axially adjustable parts, such as a first portion 30 and a second portion 32 that are axially adjustable with respect to one another to move the input device 22 closer or further away from an operator. The first portion 30 and the second portion 32 may be an upper jacket and a lower jacket, respectively, which are axially movable relative to one another The embodiments disclosed herein are utilized in electric power steering systems where the output assembly 28 is in operative communication with a motor 56 of a road wheel steering assembly 40. The steering system 20 may be a steer-by-wire configuration, where the output assembly 28 is in wired or wireless communication with the motor 56 to control operation of the motor 56, with no direct mechanical connection between the output assembly 28 and the road wheel steering assembly 40. Alternatively, the steering system 20 may be a mechanical configuration, where the output assembly 28 is communicatively coupled to the road wheel steering assembly 40 by a shaft 36 and pinion. This connection allows for the steering column 26 to transfer physical rotation from the input device 22 to the road wheel assembly 40, which is assisted with the motor 56.

Referring still to FIG. 1, the steering assembly 40 may include a ball screw-nut assembly 42, a pair of tie rods 44, a pair of knuckles 46, and a pair of wheels 48 operatively coupled to the pair of knuckles 46 to permit the knuckles 46 to pivot the wheels 48 for steering maneuvers. The ball screw-nut assembly 42 may include a ball screw 52, a nut 54, and the motor 56. In some embodiments, more than one motor 56 may be included. The ball screw-nut assembly 42 drives tie rods in a cross-car direction to effectuate the steering maneuvers.

Figure 2:
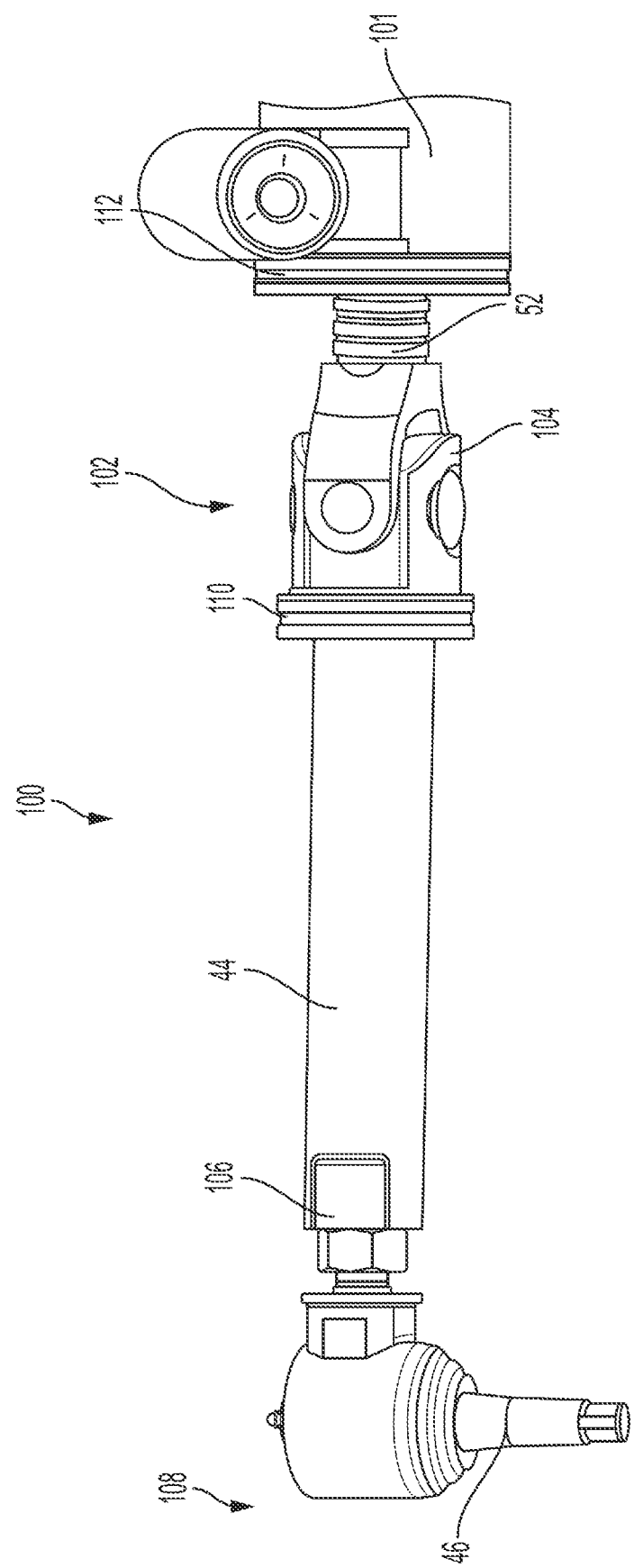
FIG. 2 is a perspective view of a tie rod assembly for the EPS system.

Referring now to FIG. 2, a tie rod assembly 100 of the steering system 20 is illustrated in detail. The embodiments described herein facilitate removal of an anti-rotation component or assembly from the road wheel steering assembly and incorporates the anti-rotation structure into the tie rod assembly 100 at a joint assembly 102 located at a first end region 104 of the tie rod 44. As shown, the tie rod assembly 100 includes the tie rod 44 which extends from the first end region 104 to a second end region 106. The joint assembly 102 coupling the tie rod 44 to the ball screw 52 is located proximate the first end region 104 of the tie rod 44. The second end region 106 of the tie rod 44 is operatively coupled to the knuckle 46 with a knuckle joint assembly 108.

The joint assembly 102 is coupled to the ball screw 52 by screwing an inner threaded surface of the joint assembly 102 to the ball screw 52. A sealing boot (not shown) covers the joint assembly 102 in an assembled condition by securing to boot coupling locations 110, 112 on the tie rod 44 and a housing 101 of the ball screw 52.

Figure 3:
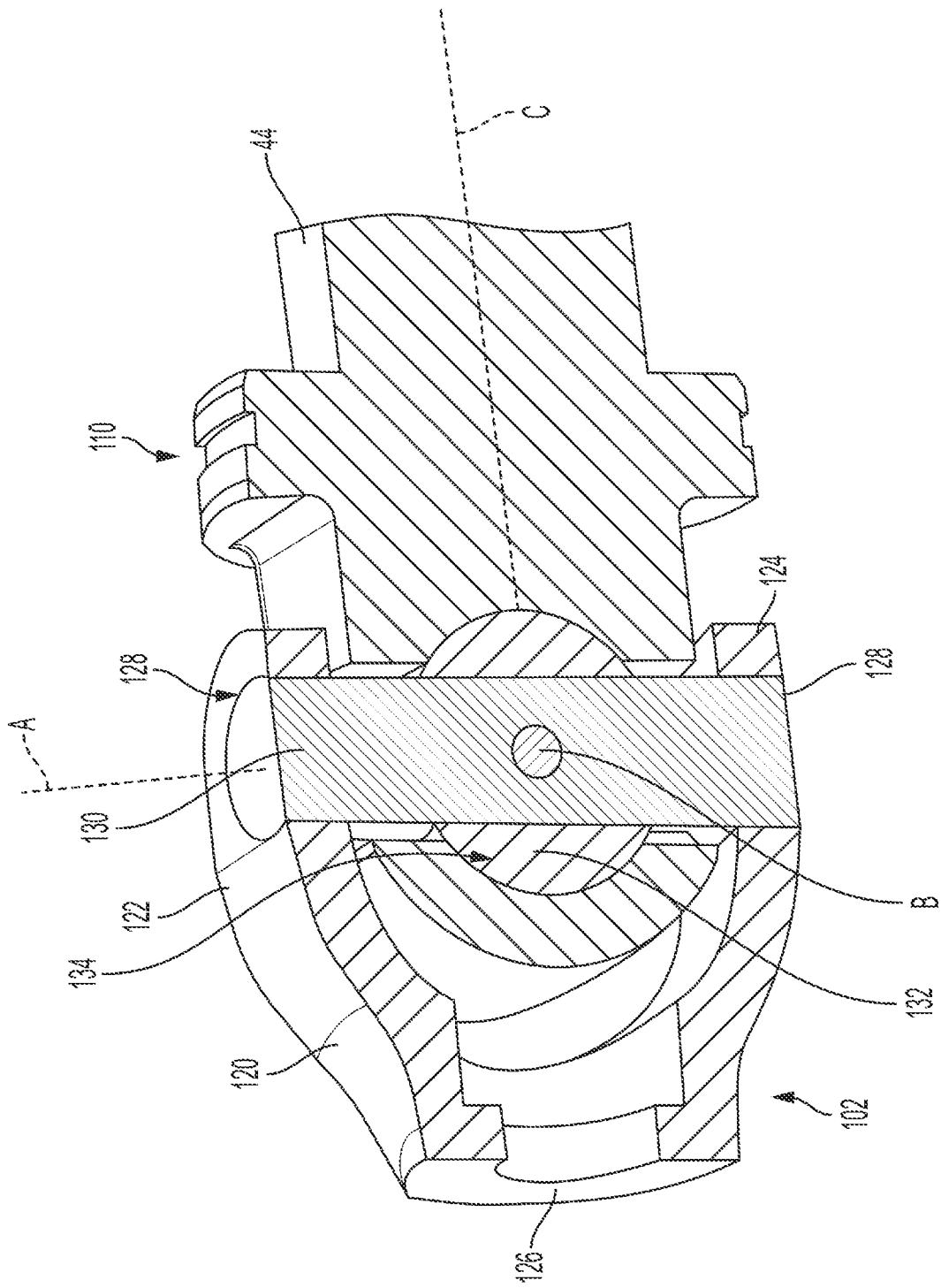
FIG. 3 is a perspective, cross-sectional view of a joint of the tie rod assembly.
Figure 5:
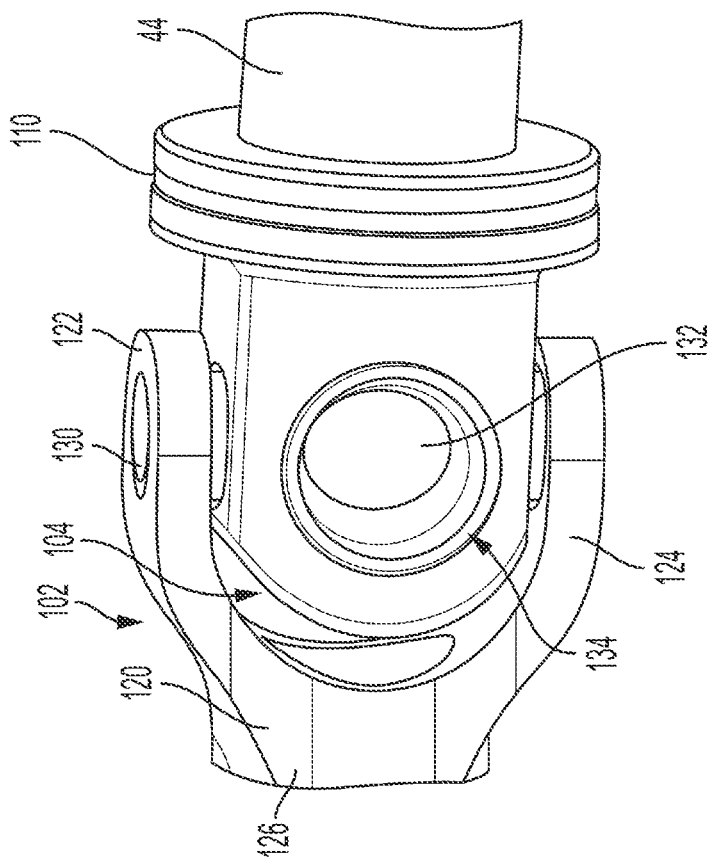
FIG. 5 is a perspective view of the joint of the tie rod assembly.
Figure 4:
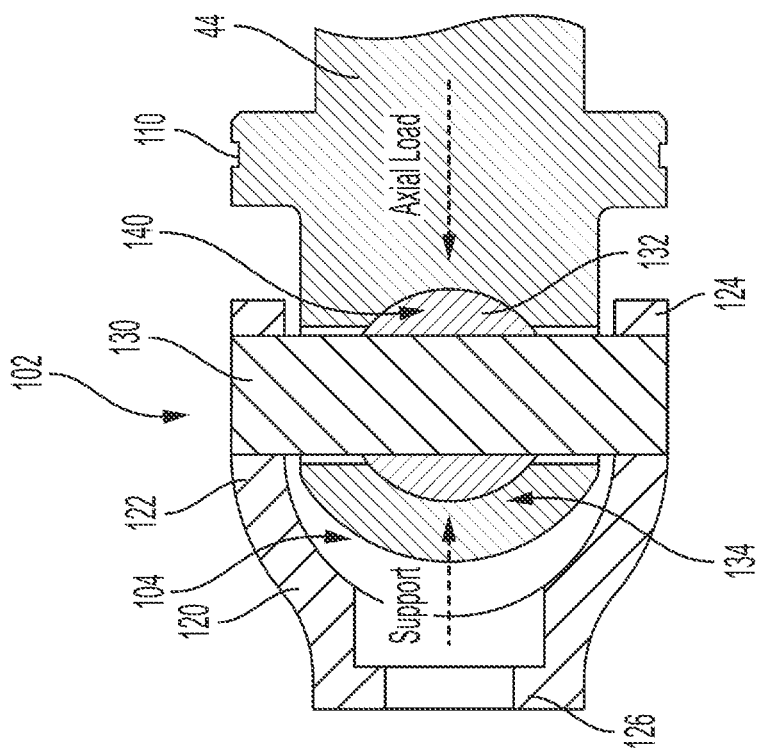
FIG. 4 is an elevational, cross-sectional view of the joint of the tie rod assembly.

Referring now to FIGS. 3-5, the joint assembly 102 of the tie rod assembly 100 is shown in greater detail. The joint assembly 102 is a joint that connects the tie rod 44 to the ball screw 52 in a manner that allows articulation about two axes, while limiting or preventing rotation about a third axis. In particular, the first axis is referenced with A and is substantially perpendicular to a longitudinal direction of the tie rod 44. The second axis is referenced with B and is also substantially perpendicular to the longitudinal direction of the tie rod 44, while also being substantially perpendicular to the first axis A. The third axis is referenced with C and is substantially oriented along the longitudinal direction of the tie rod 44. As such, preventing rotation about the third axis C allows axial load to be transmitted at the joint assembly 102 between the tie rod 44 and the ball screw 52, but does not permit torque transfer between the tie rod 44 and the ball screw 52 due to the rotational restriction about the third axis C.

The joint assembly 102 may be partially formed with an inverted standard spider or cardan type joint. This type of joint is typically not capable of supporting significant axial load because the center portion of the spider is unsupported, but the embodiments disclosed herein invert a spider style design to allow axial load to be transmitted along with a first axis rotational load.

The joint assembly 102 includes a yoke 120 which is the portion of the joint assembly 102 threaded to the ball screw 52. The yoke 120 includes a first leg 122 and a second leg 124 extending from a base portion 126. The first leg 122 and the second leg 124 each define a respective through pin hole 128. The through pin holes 128 of the legs 122, 124 are aligned to receive a first pin 130 which extends therethrough. The first pin 130—also referred to herein as a through pin 130—extends through the holes 128 and is positioned within an inner cavity defined by the first and second legs 122, 124. The through pin 130 may be formed of any rigid material such as steel, for example. The through pin 130 is press fit to the surfaces of the yoke 120 that define the through pin holes 128 in some embodiments, but the precise connection may vary depending upon the particular application. The through pin 130 allows movement of the tie rod 44 side-to-side, relative to the ball screw 52, but transmits a rotational load.

A second pin 132—also referred to herein as a cross pin 132—is positioned within a hole 134 defined at the first end region 104 of the tie rod 44. The cross pin 132 allows movement in an up and down direction—as illustrated—but again transmits rotational load. The cross pin 132 may be formed of various contemplated materials, but is plastic in some embodiments. Additionally, some embodiments include a cross pin 132 formed of metal with a low friction material (e.g., plastic) wear surface. The cross pin 132 is press fit to the surfaces of the tie rod 44 that define the hole 134 and then heated, but alternative connections are contemplated. The cross pin 132 defines a central hole 140 sized to allow the through pin 130 to be positioned therein. The through pin 130 may also be press fit to the surfaces that define the central hole 140.

The "pin-in-pin" structure of the joint assembly 102 allows the disclosed embodiments of the connected components to have freedom for articulation, while still transmitting rotational load. This allows the assembly to transmit—or in this case resist—the assist load of the ball screw 52, thereby providing an anti-rotation function, while still allowing articulation of the joint assembly 102 as a standard ball joint would. The embodiments disclosed herein provide a tie rod assembly 100 having an axial load fully supported through the joint assembly 102, in contrast to only the diameter of the pin.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electric power steering system comprising:
    a ball screw;
    a tie rod having an end region, wherein the tie rod defines a first hole extending along a first axis at the end region, wherein the tie rod defines a second hole extending along a second axis that intersects with, and is substantially perpendicular to, the first axis at the end region; and
    a joint assembly operatively coupling the end region of the tie rod to the ball screw, the joint assembly comprising:
        a yoke including a first leg and a second leg, wherein each of the first and second legs define a respective hole aligned with each other;
        a first pin extending through each of the respective hole defined by the first leg and the second leg of the yoke and through the first hole of the tie rod; and a second pin disposed in the second hole defined by the tie rod and defining a central hole that the first pin extends through, wherein the tie rod is rotatable, relative to the ball screw, about the first axis and the second axis, but is prevented from rotation about a longitudinal axis of the tie rod, wherein the yoke is directly threaded to the ball screw.

2. The electric power steering system of claim 1, wherein the first pin is formed of metal.

3. The electric power steering system of claim 1, wherein the second pin is formed of plastic.

4. The electric power steering system of claim 1, wherein the second pin is formed of metal with a wear surface coating material having a lower friction coefficient compared to metal.

5. The electric power steering system of claim 1, wherein the first pin is press fit to a surface defining the central hole of the second pin.

6. The electric power steering system of claim 1, wherein the first pin is press fit to a surface defining the hole in the first leg of the yoke and a surface defining the hole in the second leg of the yoke.

7. The electric power steering system of claim 1, wherein the second pin is press fit to a surface defining the second hole of the tie rod.

8. The electric power steering system of claim 1, wherein the tie rod and the ball screw transmit axial load to each other.

* * * * *